(12) United States Patent
Hryniuk

(10) Patent No.: US 12,290,026 B2
(45) Date of Patent: May 6, 2025

(54) APPARATUS FOR STORING DRY MATERIAL

(71) Applicant: Mark Frederick Hryniuk, Saskatoon (CA)

(72) Inventor: Mark Frederick Hryniuk, Saskatoon (CA)

( * ) Notice: Subject to any disclaimer, the term of this patent is extended or adjusted under 35 U.S.C. 154(b) by 709 days.

(21) Appl. No.: 17/684,789

(22) Filed: Mar. 2, 2022

(65) Prior Publication Data

US 2022/0279727 A1 Sep. 8, 2022

Related U.S. Application Data

(60) Provisional application No. 63/200,409, filed on Mar. 5, 2021.

(51) Int. Cl.
*A01F 25/18* (2006.01)
*A01F 25/13* (2006.01)
*A01F 25/16* (2006.01)
*A01F 25/22* (2006.01)

(52) U.S. Cl.
CPC ............ *A01F 25/186* (2013.01); *A01F 25/13* (2013.01); *A01F 25/166* (2013.01); *A01F 25/22* (2013.01)

(58) Field of Classification Search
CPC ...... A01F 25/186; A01F 25/22; A01F 25/166; A01F 25/13

USPC .......................................................... 34/218
See application file for complete search history.

(56) References Cited

U.S. PATENT DOCUMENTS

| | | | | |
|---|---|---|---|---|
| 4,038,021 A | * | 7/1977 | Benson | F26B 11/0445 |
| | | | | 432/118 |
| 5,561,916 A | * | 10/1996 | Willgohs | F26B 3/084 |
| | | | | 34/169 |
| 8,844,157 B2 | * | 9/2014 | Wagner, Jr. | F26B 25/06 |
| | | | | 34/361 |
| 10,433,490 B2 | * | 10/2019 | Trucke | E04H 7/24 |
| 11,314,213 B1 | * | 4/2022 | Harweger | G01N 33/0098 |
| 11,839,181 B2 | * | 12/2023 | Koch | A01F 25/22 |
| 11,852,409 B2 | * | 12/2023 | Maendel | F23G 7/10 |
| 11,968,925 B2 | * | 4/2024 | Ceglinski | A01D 45/021 |
| 12,181,218 B2 | * | 12/2024 | Heilskov | F26B 17/1425 |
| 2022/0279727 A1 | * | 9/2022 | Hryniuk | B65G 33/265 |
| 2023/0284567 A1 | * | 9/2023 | Johnson | B62D 57/036 |
| 2024/0369298 A1 | * | 11/2024 | Hryniuk | F26B 9/103 |

FOREIGN PATENT DOCUMENTS

| | | | | | |
|---|---|---|---|---|---|
| CN | 114760831 A | * | 7/2022 | ........ | A01D 41/1208 |
| KR | 2023036637 A | * | 3/2023 | | |
| WO | WO-2021113392 A1 | * | 6/2021 | ........ | A01D 41/1208 |

* cited by examiner

*Primary Examiner* — Stephen M Gravini

(57) ABSTRACT

A modular, low-profile apparatus for storing dry agricultural products has a horizontal configuration with coaxial aeration tubes and bi-directional distribution and dispensing augers. The apparatus provides access to dry agriculture products for storing, mixing, aerating, loading, unloading and processing.

11 Claims, 5 Drawing Sheets

APPARATUS FOR STORING DRY MATERIAL

TECHNICAL FIELD

The invention relates to agricultural equipment and related grain storage and more specifically to aeration systems for agricultural material, and dispensing and distribution systems for stored grain.

BACKGROUND

Agricultural crops are commonly stored in vertical cylindrical storage facilities at farms, cooperatives or corporation locations that store grain after harvesting.

Aeration systems and techniques have been developed to aerate stored grain. Moving air through stored grain balances humidity levels, with the result of reducing grain spoilage, preventing storage losses. By maintaining a cool, uniform temperature during a storage duration, aeration reduces mold, microbial and insect activity, and prevents moisture migration.

Storing, mixing and dispensing grain all require access to the grain. Common grain-storage facilities are silos, which are vertically oriented. An accessible alternative is a horizontal system that enables farm personnel to more easily reach the grain. Horizontal systems also enable higher storage capacity. A horizontally oriented apparatus combined with an aeration device enables uniform distribution of air, resulting in consistent moisture content of the stored material.

SUMMARY

An apparatus for storing dry agricultural products is oriented in a horizontal, low-profile bin/module system. The modular storage unit, horizontally configured, provides access to dry agriculture products (such as grain) for storing, mixing, aerating, loading, unloading and processing. The apparatus's orientation may be understood to resemble that of a silo that has been split in two and reoriented horizontally, the split forming two halves of a horizontal storage bin. The interior, long side walls of these substantially halved storage modules (also referred to as bins) are constructed taller than those of the exterior sides so as to increase storage volume.

In one embodiment, two semi-cylindrical storage modules are joined along their interior, long side walls to form a double-moduled storage apparatus. At the top of the apparatus, a load auger assists in spread-loading introduced dry material across the upper length of the apparatus and into the storage bins. In the bottom of the apparatus, unload augers are for mixing and dispensing grain. Fans in end walls of the apparatus bring ambient air into the modules through aeration tubes, which are disposed along the interior length of each module. Controlled air in the modules controls the moisture content of the stored grain.

The top auger is bidirectional, moving grain laterally in two directions once the grain is introduced via exterior receptacles. One side of the auger has a right-hand thread, effecting a clockwise helical form originating from the center of the auger and terminating at a first end of the auger. The opposite side of the auger has a left-hand thread, effecting a counterclockwise helical form originating from the center of the auger and terminating at a second end. Such an auger can spread grain along the length of the apparatus when the grain is loaded from the center. In another example use, the bidirectional auger can spread grain along the length of the apparatus when the grain is loaded from either or both ends of the storage module.

One skilled in the art understands that the auger's shaft can turn in a first direction (clockwise) and in a second direction (counterclockwise). As the shaft rotates in a first direction, grain is conducted inward. This direction is for loading the grain from terminal-end receptacles of the apparatus. When the shaft rotates in a second direction, the reversed direction of the helical threads directs the grain outward from the center area. This direction is for loading the grain from a receptacle at the center of the apparatus. One skilled in the art understands that an auger may be driven by a direct-drive motor, by a motor-and-belt-combination, or by similar mechanism.

The top auger has apertures along its length so that grain may be dropped across the entirety of the storage bin. If the grain capacity reaches to the augers, augers may continue to turn to push grain up until the bin is completely full.

A U-shaped channel beneath each auger has evenly spaced gaps for catching and dispensing grain.

An aeration tube, disposed coaxially in a semi-cylindrical storage module, extends the length of the storage module. It is open at each end. In some embodiments at least one fan, disposed at each terminal end, is connected to an end of each aeration tube, providing air movement and consistent moisture control.

A lower bidirectional auger is disposed along the bottom of each semi-cylindrical storage module. It assists in dispensing stored dry material. Caps, understood in the art, are disposed above and along the length of the dispensing auger to prevent the weight of stored material from resting on the dispensing auger and to allow the flow of grain through the auger for dispensing. In some embodiments, the upper auger has a cap to protect dry material from weather. A cap may have one or more openings.

Presented drawings of these embodiments are understood as illustrative and not limiting.

DESCRIPTION

Figure 1:
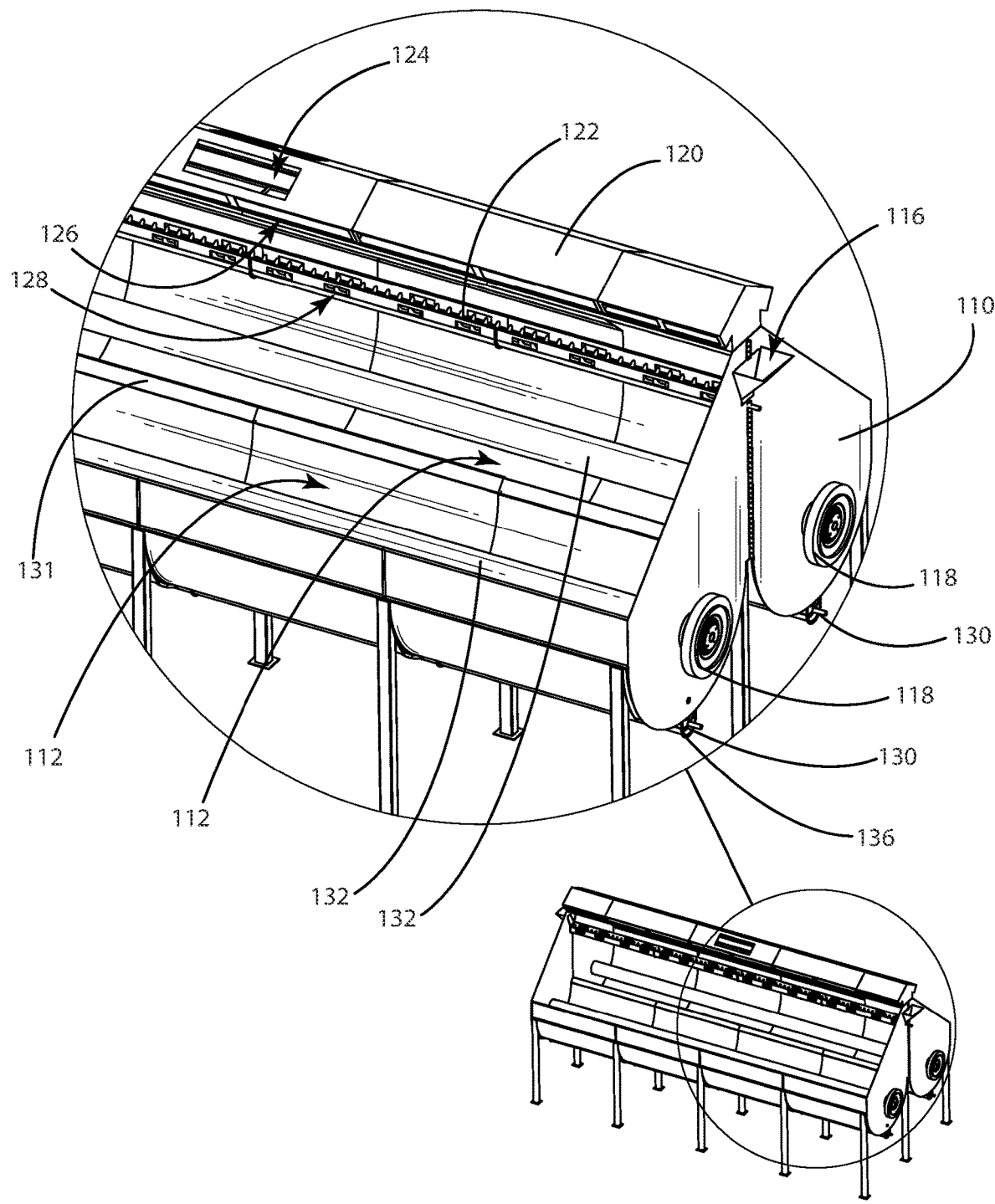
FIG. 1 is a perspective, detailed view of an example embodiment of the present disclosure.
Figure 2:
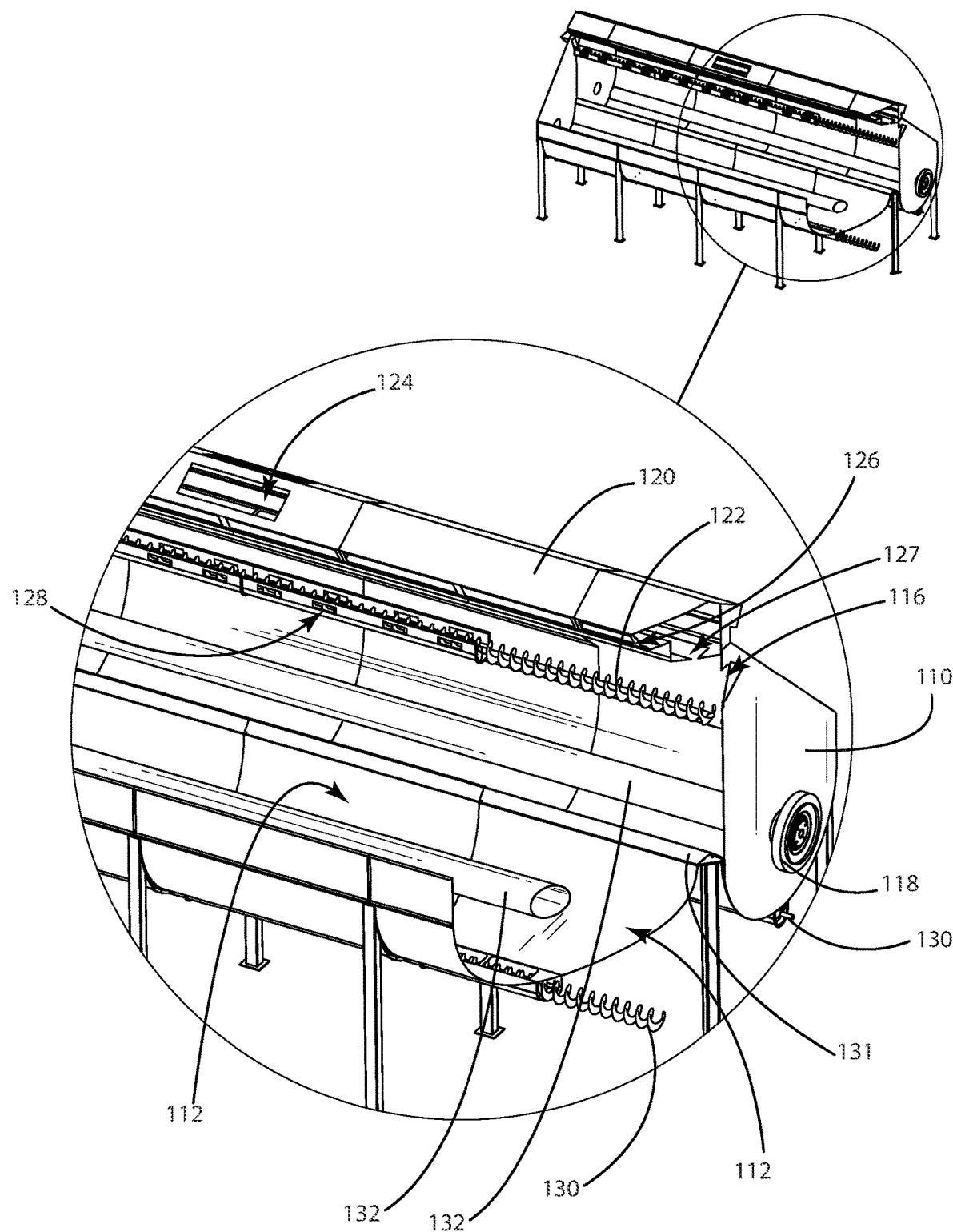
FIG. 2 is a perspective, detailed, partial-cutaway view of an example embodiment.
Figure 3:
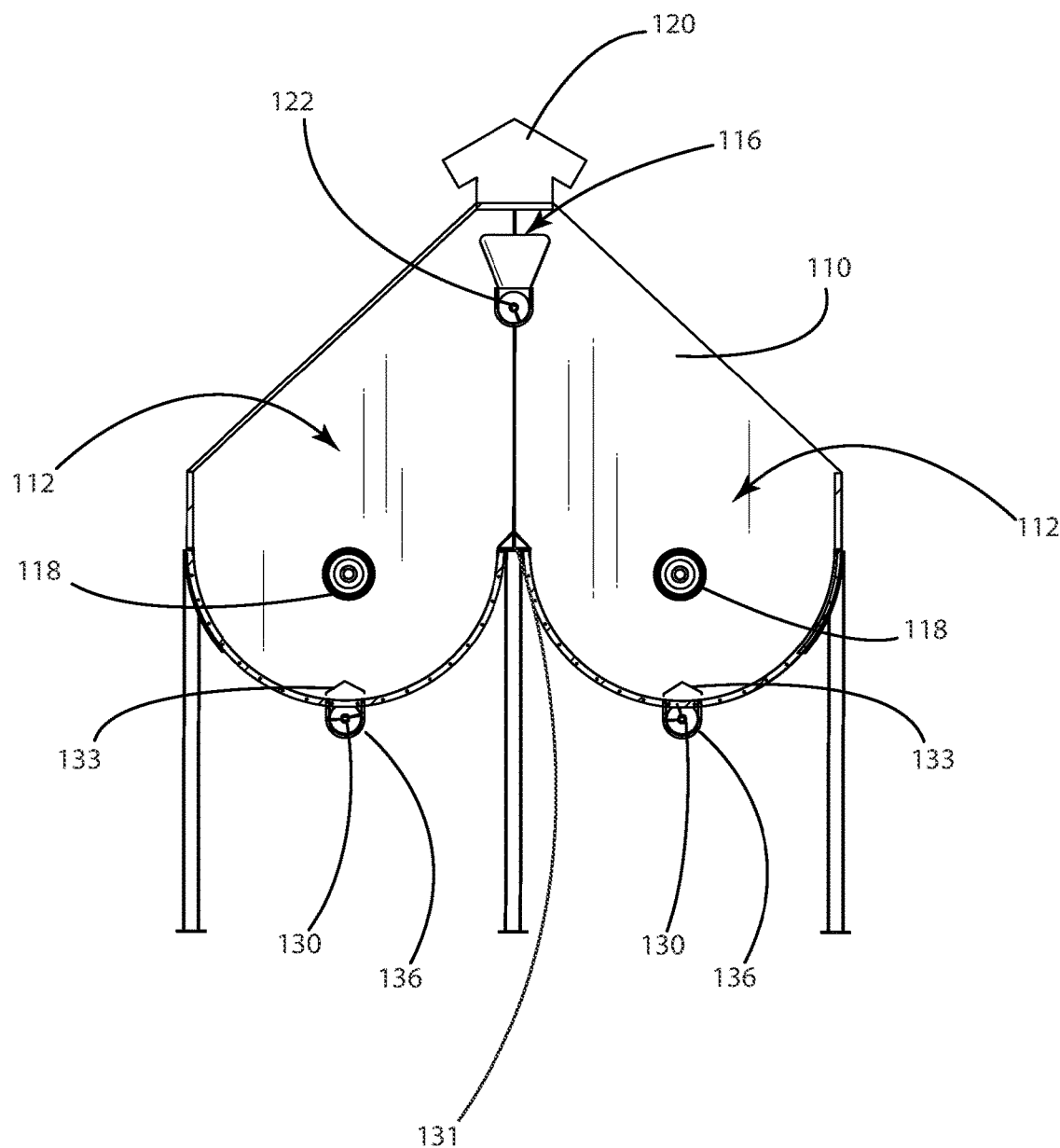
FIG. 3 is a side cross-sectional view of an example embodiment.

In FIGS. 1, 2 and 3, two semi-cylindrical storage modules 112 are joined along the apparatus's long axis 131. Aeration tubes 132 are disposed coaxially in each semi-cylindrical storage module 112. Aeration tubes 132 have permeable sidewalls and may be constructed of perforated, thin-walled material such as plastic, sheet metal, expanded metal mesh or screening. One skilled in the art is familiar with materials that may be used to form an air-permeable tube. Aeration tubes extend through end walls 110 and are open to the ambient atmosphere. A fan 118 may be joined at any of the openings of aeration tubes. Fan(s) 118 send air into aeration tubes 132 to control the moisture content of dry material in the storage modules 112.

In an example embodiment, an upper auger 122 resides above the storage modules 112 along the joined, long edges of the modules 131. A cap 120 protects dry material from the elements. In some embodiments the upper auger 122 has a clockwise thread disposed from the center of the apparatus to one end and a counter-clockwise thread disposed from the center of the apparatus to the opposite end. This is referred to as a bi-directional auger. Material loaded into the apparatus at receptacle 124 may be spread evenly along the storage modules 112 by the auger 122. Dry material loaded via terminal receptacle(s) 116 is distributed toward the center of the storage modules 112. One skilled in the art understands that driving the auger in a particular direction distributes material into receptacle 124 from the center of the apparatus to both ends, and by reversing the direction of rotation of the auger 124, material is evenly distributed from the receptacle 116 toward the center of the storage modules 112. One skilled in the art understands that there are various ways to access the modules, such as through a receptacle 124, or the same may be achieved by way of flaps, hatches, and the like, to pour grain into the modules while keeping out rain and wind.

External augers 130, coaxially disposed below each of the storage modules 112, are configured to dispense dry material. One skilled in the art understands how such augers may reside above a U-shaped channel 136 with openings above and below to dispense dry material. A cap 133 directs the flow of dry material into an auger 130 so as to avoid jamming the auger 130.

Figure 4:
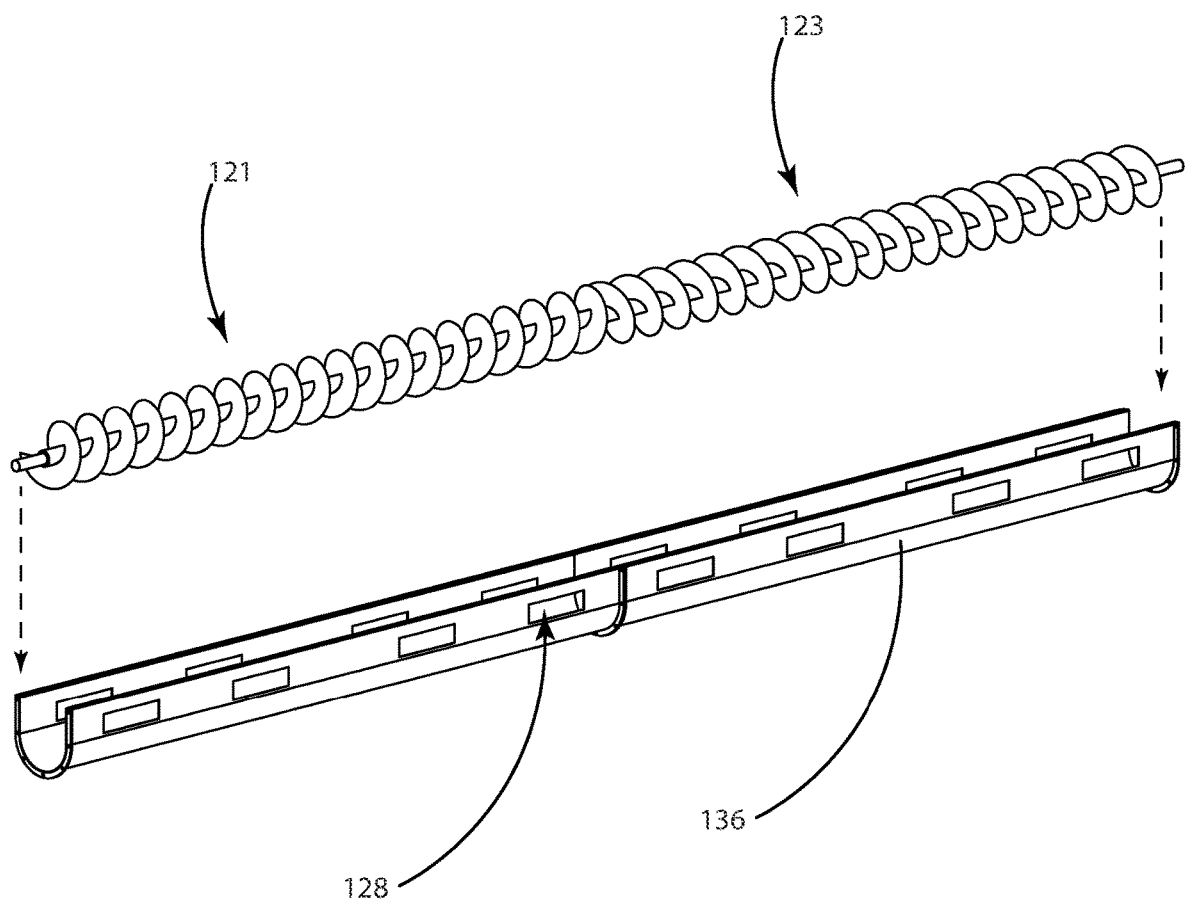
FIG. 4 is an exploded view of parts of the embodiment.

In FIG. 4 opposing threads 121 and 123 can be seen on a bidirectional auger 122. A U-shaped channel 136 is disposed beneath each auger of the apparatus. The channel has evenly spaced gaps 128 for dispersing grain. One skilled in the art understands that similar openings may be used in lower augers for dispensing grain.

Figure 5:
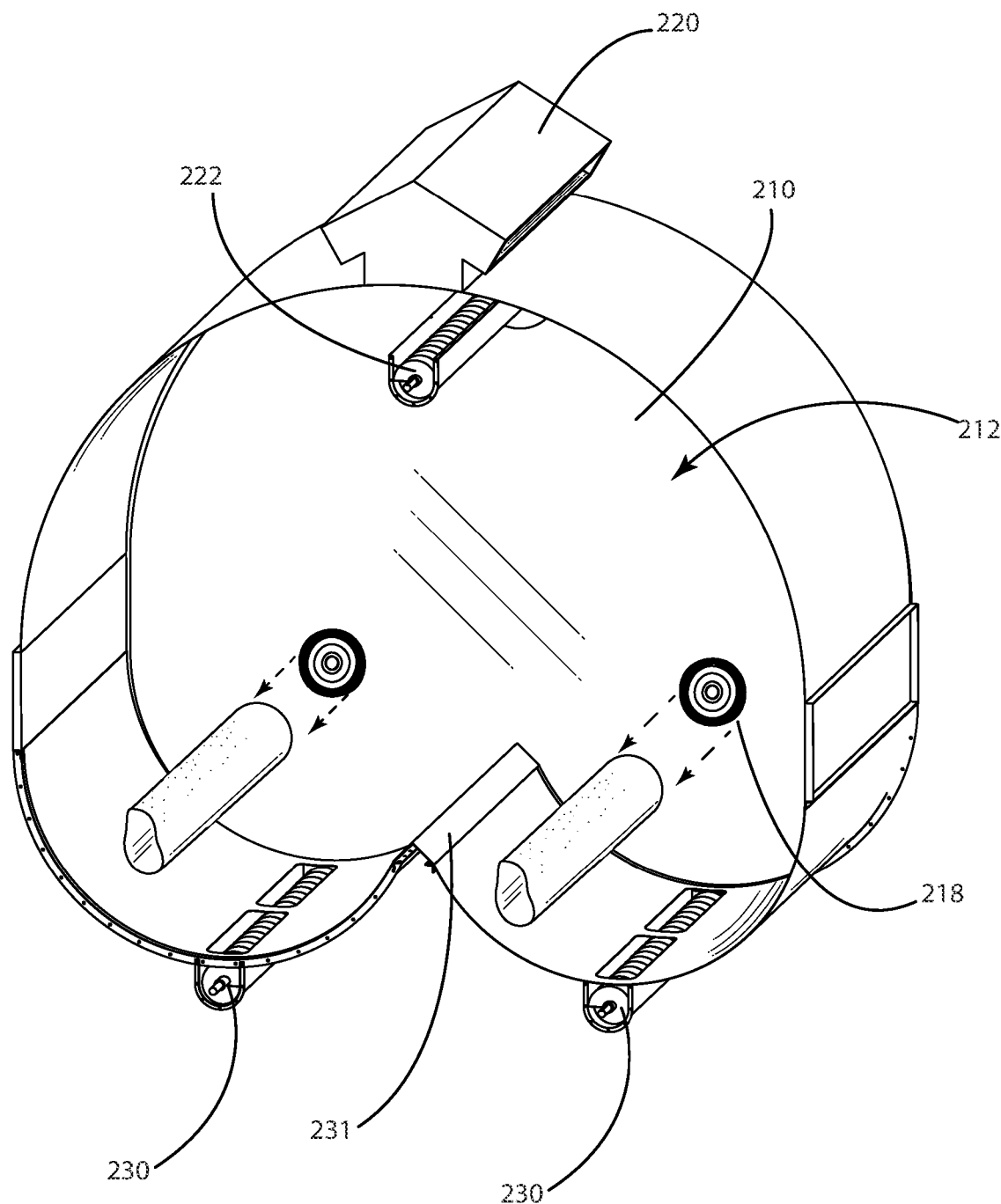
FIG. 5 is a perspective view of a component of an iteration of the embodiment.

FIG. 5 illustrates an iteration 200 of the embodiment. Two semi-cylindrical storage modules 212 are joined along their interior edges 231. In this embodiment the interior edge 231 is relatively lower in height than that of interior edge 131 of iteration 100 (FIG. 3). Aeration tubes 232 are disposed in each storage module 212. Aeration tubes 232 have permeable sidewalls and may be constructed of perforated, thin-walled material such as plastic, sheet metal or expanded metal mesh or screen. Aeration tubes extend through end walls 210 and are open to the ambient air. A fan 218 is connected to an end of an aeration tube.

The invention claimed is:

1. An apparatus for storing dry agricultural material comprising:
   at least one horizontal semi-cylindrical storage module having a center, an interior, an exterior, a long axis, a first terminal wall and a second terminal wall; and
   at least one aeration tube of a perforated material, coaxial with said semi-cylindrical storage module long axis, piercing said first terminal wall and said second terminal wall; and
   at least one upper auger residing above said aeration tube and parallel to said semi-cylindrical storage module long axis; and
   said at least one upper auger having a clockwise thread disposed from approximately a center of the semi-cylindrical storage module to said first terminal wall; and having a counter-clockwise thread disposed from approximately the center of the semi-cylindrical storage module to said second terminal wall; wherein
   feeding dry agricultural material into the center of said at least one upper auger, while said auger is rotating, disperses said dry agricultural material from the center toward the first terminal wall and second terminal wall of said storage module.

2. The apparatus of claim 1 further comprising:
   at least one aeration fan in fluid communication between said exterior of said storage module and an interior of said at least one aeration tube, and engaged with said aeration tube; wherein
   the aeration fan moves air through said perforated material of said aeration tube and into said dry agricultural material to aerate said dry agricultural material.

3. The apparatus of claim 1 further comprising:
   a cap covering said at least one upper auger, and
   a least one aperture at an end of said cap, the aperture having a lid; wherein
   the lid may be opened to pour in the dry agricultural material.

4. The apparatus of claim 1 further comprising:
   at least a first lower auger disposed below said aeration tube and parallel to said storage module long axis, the lower auger having a clockwise thread comprising substantially one half of the lower auger, and a counter-clockwise thread comprising substantially the other half the lower auger, and
   a channel partially surrounding the bottom of said at least a first lower auger; and
   at least one aperture in said channel; wherein
   dry agricultural material is dispensed through the aperture in said channel.

5. The apparatus of claim 4 further comprising:
   a cap with open sides positioned over said lower auger; wherein
   the cap prohibits dry agricultural material from packing onto said lower auger, enabling dry material to flow about said lower auger.

6. An apparatus for storing dry agricultural material comprising:
   at least two semi-cylindrical storage modules paired side by side, joined at one exterior side;
   each semi-cylindrical storage module having a center, an interior, an exterior, a long axis, a first terminal wall and a second terminal wall; at least one aeration tube of a perforated material, coaxial with said semi-cylindrical storage module long axis, piercing said first terminal wall and said second terminal wall; and
   said at least one aeration tube in fluid communication with said exterior of said storage module; and
   at least one upper auger residing above said at least one aeration tube and parallel to said semi-cylindrical storage module long axis; and
   said at least one upper auger having a clockwise thread disposed from approximately a center of the storage module to a first end; and having a counter-clockwise thread disposed from approximately the center of said storage module to a second end; wherein
   feeding dry agricultural material into the center of said upper auger, while said auger is rotating, disperses said dry agricultural material from the center toward the first terminal wall and second terminal wall of said storage semi-cylindrical storage module; and
   reversing the direction of said upper auger, feeding dry agricultural material into an opening at one end of said upper auger, disperses said dry agricultural material from said one end toward the center of the storage module.

7. The apparatus of claim 6 further comprising:
at least one aeration fan in fluid communication between said exterior of said storage module and an interior of said at least one aeration tube, and engaged with said aeration tube; wherein
the aeration fan expels air through said perforated material into said dry agricultural material to aerate said dry agricultural material.

8. The apparatus of claim 6 further comprising:
at least two lower augers residing below each of at least two aeration tubes and parallel to said storage module long axis, each lower auger having a clockwise thread disposed from approximately a center of the semi-cylindrical storage module to the first end; and
having a counter-clockwise thread disposed from approximately the center of the semi-cylindrical storage module to the second end; and
at least one opening in said storage module proximal to each of said at least two lower augers, having an open position and a closed position; wherein
with the opening in the open position, rotating said at least one of said at least two lower augers dispenses said dry agricultural material from said first end and said second end of the storage module.

9. The apparatus of claim 8 further comprising:
a cap with open sides positioned over said lower auger; wherein
the cap prohibits dry agricultural material from packing onto said lower auger, enabling dry material to flow about said lower auger.

10. A method of using the apparatus of claim 9, the method comprising:
feeding dry agricultural material into the center of said at least one upper auger,
causing said at least one upper auger to rotate in a first direction;
dispersing said dry agricultural material from the center of said at least one upper auger to the first end and to the second end of said storage module;
as dry agricultural material pours through two lower augers it causes said two lower augers to rotate in a first direction, moving said dry agricultural material from the first end and second end of said interior of said storage module to the center of said exterior of said storage module.

11. A method of using the apparatus of claim 9, the method comprising:
feeding dry agricultural material into the center of said at least one upper auger;
causing said at least one upper auger to rotate;
dispersing said dry agricultural material from the first end and to the second end of said storage module to the center of the storage module; and
rotating two lower augers, and moving said dry agricultural material from the center of said interior of said storage module to said first end and to said second end of said exterior of said storage module; and
dispensing said dry agricultural material.

* * * * *